US008635603B2

(12) United States Patent
Gooding et al.

(10) Patent No.: US 8,635,603 B2
(45) Date of Patent: Jan. 21, 2014

(54) HANDLING DEBUGGER BREAKPOINTS IN A SHARED INSTRUCTION SYSTEM (75) Inventors: Thomas Michael Gooding, Rochester, MN (US); Richard Michael Shok, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 12/255,138

(22) Filed: Oct. 21, 2008

(65) Prior Publication Data

US 2010/0100715 A1 Apr. 22, 2010

(51) Int. Cl.
*G06F 9/44* (2006.01)
*G06F 11/00* (2006.01)

(52) U.S. Cl.
USPC ............... 717/129; 717/134; 714/34; 714/35

(58) Field of Classification Search
None
See application file for complete search history.

(56) References Cited

U.S. PATENT DOCUMENTS

| | | | |
|---|---|---|---|
| 5,619,409 A * | 4/1997 | Schultz et al. ............... | 700/17 |
| 6,480,818 B1 * | 11/2002 | Alverson et al. ............. | 703/26 |
| 6,925,634 B2 * | 8/2005 | Hunter et al. ............... | 717/124 |
| 6,990,657 B2 * | 1/2006 | Hunter et al. ............... | 717/129 |
| 7,007,267 B2 * | 2/2006 | Hunter et al. ............... | 717/124 |
| 7,039,901 B2 * | 5/2006 | Hunter et al. ............... | 717/124 |
| 7,353,498 B2 * | 4/2008 | Gupta et al. ................ | 717/125 |
| 7,428,727 B2 * | 9/2008 | Alverson et al. ............. | 717/134 |
| 7,543,186 B2 * | 6/2009 | Schultz ....................... | 714/35 |
| 7,950,001 B2 * | 5/2011 | Panchamukhi et al. ....... | 717/124 |
| 8,201,152 B2 * | 6/2012 | Li et al. ...................... | 717/129 |
| 8,341,604 B2 * | 12/2012 | Codrescu et al. ............ | 717/129 |
| 8,370,806 B2 * | 2/2013 | Codrescu et al. ............ | 717/124 |
| 8,380,966 B2 * | 2/2013 | Codrescu et al. ............ | 712/227 |
| 2002/0100019 A1 * | 7/2002 | Hunter et al. ............... | 717/124 |
| 2002/0100020 A1 * | 7/2002 | Hunter et al. ............... | 717/124 |
| 2002/0100021 A1 * | 7/2002 | Hunter et al. ............... | 717/124 |
| 2002/0100024 A1 * | 7/2002 | Hunter et al. ............... | 717/129 |
| 2005/0034024 A1 * | 2/2005 | Alverson et al. ............. | 714/38 |
| 2005/0246688 A1 * | 11/2005 | Gupta et al. ................ | 717/124 |
| 2006/0069959 A1 * | 3/2006 | Schultz ....................... | 714/35 |
| 2008/0114972 A1 * | 5/2008 | Codrescu et al. ............ | 712/227 |

(Continued)

OTHER PUBLICATIONS

Banakar et al., Scratchpad Memory: A Design Alternative for Cache On-chip memory in Embedded Systems, publised by ACM 2002, p. 73-78.*

(Continued)

*Primary Examiner* — Tuan Q. Dam
*Assistant Examiner* — Zheng Wei
(74) *Attorney, Agent, or Firm* — Martin & Associates, LLC; Derek P. Martin (57) ABSTRACT

A debugger debugs processes that execute shared instructions so a breakpoint set for one process will not cause a breakpoint to occur in the other processes. A breakpoint is set by recording the original instruction at the desired location and writing a trap instruction to the shared instructions at that location. When a process encounters the breakpoint, the process passes control to the debugger for breakpoint processing if the breakpoint was set at that location for that process. If the trap was not set at that location for that process, the cacheline containing the trap is copied to a small scratchpad memory, and the virtual memory mappings are changed to translate the virtual address of the cacheline to the scratchpad. The original instruction is then written to replace the trap instruction in the scratchpad, so the process can execute the instructions in the scratchpad thereby avoiding the trap instruction.

10 Claims, 6 Drawing Sheets

(56) References Cited

U.S. PATENT DOCUMENTS

| | | | |
|---|---|---|---|
| 2008/0115113 A1* | 5/2008 | Codrescu et al. | 717/127 |
| 2008/0115115 A1* | 5/2008 | Codrescu et al. | 717/128 |
| 2008/0270988 A1* | 10/2008 | Li et al. | 717/125 |
| 2010/0064283 A1* | 3/2010 | Pett | 717/129 |
| 2012/0131558 A1* | 5/2012 | Bates et al. | 717/129 |

OTHER PUBLICATIONS

Hiramatsu et al., Djprobe—Kernel probing with the samllest overhead—Proceedings of the Linux Symposium, Volume One published Jun. 27-30, 2007, pp. 189-199.*

* cited by examiner

HANDLING DEBUGGER BREAKPOINTS IN A SHARED INSTRUCTION SYSTEM

STATEMENT REGARDING FEDERALLY SPONSORED RESEARCH OR DEVELOPMENT

This invention was made with U.S. Government support under Contract No. B554331 awarded by the U.S. Department of Energy. The U.S. Government has certain rights in this invention.

BACKGROUND

1. Technical Field

This invention generally relates to computer systems that execute multiple processes from a shared instruction stream, and more specifically relates to the handling of debugger breakpoints in such computer systems.

2. Background Art

Computer systems have evolved into extremely sophisticated devices, and may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program.

Known debuggers allow the programmer to set one or more breakpoints in the computer program, which are points where the execution of the computer program is stopped so that the state of the program can be examined to verify that the program executed as designed. Breakpoints may be hardware breakpoints or software breakpoints. A software breakpoint is set at a particular instruction by replacing the instruction with a trap instruction that causes control of the program to be passed to the debugger when the trap instruction is executed. This works well when a single process executes an instruction stream. However, if multiple processes execute a shared instruction stream, setting a breakpoint at an instruction can cause all processes that execute the shared instruction stream to break at that instruction. If only one of the processes needs a breakpoint at the trap instruction, and especially if debugging the one process is best done with other processes running without encountering breakpoints, simply writing a trap instruction to the shared instruction stream is not a desirable solution. Without a way to create a breakpoint for one process in a system with multiple processes that execute a shared instruction stream without causing other processes to also break, the debugging of such computer systems will be impaired.

BRIEF SUMMARY

A debugger provides a way to debug processes that execute shared instructions so that a breakpoint set for one process will not cause a breakpoint to occur in the other processes. A breakpoint is set by storing the original instruction found at the desired location, incrementing a reference count for the desired location, then writing a trap instruction at the desired location in the shared instructions. When a process encounters the breakpoint, the process will pass control to the debugger for breakpoint processing if the breakpoint was set at that location for that process. If the breakpoint was not set at that location for that process, the cacheline containing the trap instruction is copied to a small scratchpad memory, and the virtual-to-physical address translations are changed to translate the virtual address of the cacheline to the scratchpad. The original instruction is then written to replace the trap instruction in the scratchpad. The process then executes the instructions in scratchpad instead of the instructions in the shared instructions. As a result, processes that do not have a breakpoint at a particular location can avoid the trap instruction and continue processing.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION

The disclosure and claims herein relate to a debugger in a computer system with multiple processes that execute a common instruction stream that allows setting a breakpoint in the common instruction stream and bypassing the breakpoint's trap instruction when encountered by a process for which the breakpoint is not set.

Note the terms "breakpoint" and "trap instruction" are used throughout this disclosure. For the purposes of the discussion herein, a breakpoint is defined as a desired stopping point in a computer program. A trap instruction is a specific instruction that implements a breakpoint at a desired location. Thus, a breakpoint is set at a desired location by writing a trap instruction to the desired location.

Figure 1:
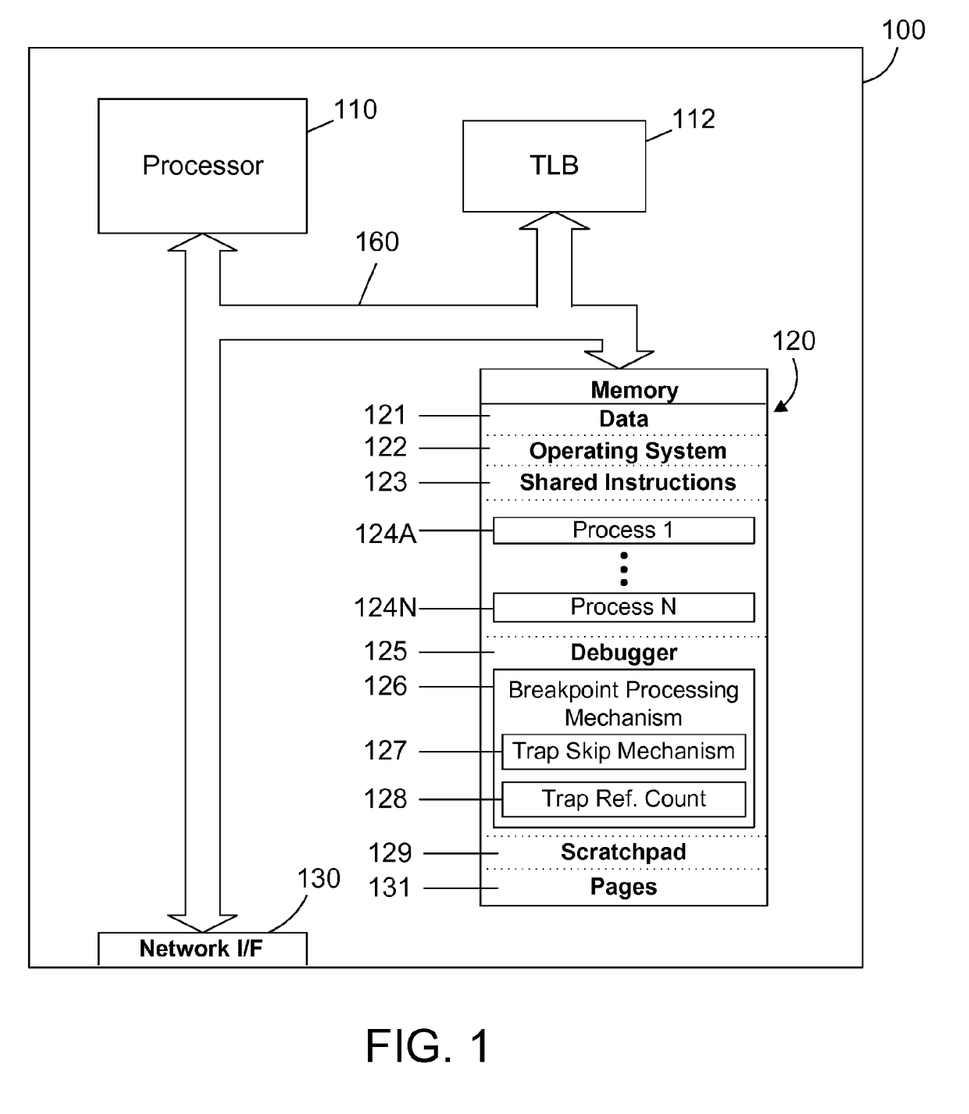
FIG. 1 is a block diagram of a computer system that includes a debugger with a breakpoint processing mechanism.

Referring to FIG. 1, a computer system 100 is one suitable implementation of a computer system that includes a debugger with a breakpoint processing mechanism. Computer system 100 could be any suitable computer system. However, those skilled in the art will appreciate that the disclosure herein applies equally to any computer system, regardless of whether the computer system is a complicated multi-user computing apparatus, a single user workstation, or an embedded control system. Examples of computer system 100 include an IBM eServer System i computer system, or a node in a multiprocessor computer system such as BlueGene developed by IBM. As shown in FIG. 1, computer system 100 comprises one or more processors 110, a translation lookaside buffer 112, a main memory 120, and a network interface 130. These system components are interconnected through the use of a system bus 160.

Main memory 120 preferably contains data 121, an operating system 122, shared instructions 123, multiple processes, shown in FIG. 1 as 124A, ..., 124N, a debugger 125, a scratchpad 129, and multiple memory pages 131. Data 121 represents any data that serves as input to or output from any program in computer system 100. Operating system 122 is a multitasking operating system; however, those skilled in the art will appreciate that the spirit and scope of this disclosure is not limited to any one operating system. One example of a suitable operating system is known in the industry as i5/OS. Shared instructions 123 represent computer code (i.e., instructions) that may be executed by multiple processes 124A, ..., 124N. Debugger 125 includes a breakpoint processing mechanism 126. The breakpoint processing mechanism 126 includes a trap skip mechanism 127 and a trap reference count 128. The breakpoint processing mechanism installs a breakpoint by writing a trap instruction at a desired location in the shared instructions 123. When a process encounters the trap instruction, the breakpoint processing mechanism 123 determines whether the trap instruction is intended for the process. If so, control is passed to the debugger 125 for normal debug operations. If not, the trap skip mechanism 126 causes the process to execute the original instruction instead of the trap instruction. The details of how this is performed are disclosed below. The trap reference count 128 is used to determine whether other processes still have a breakpoint installed at a given location when the debugger removes a breakpoint for a particular process. If so, the breakpoint is maintained for the other process(es) that need it. If not, the breakpoint is removed. The scratchpad 129 is a small portion of memory. For example, the scratchpad 129 is preferably at least an order of magnitude smaller than a smallest memory page in the computer system. The scratchpad 129 is used by trap skip mechanism 127 to skip a trap instruction, as described in more detail below. Memory pages 131 illustrate that main memory 120 is preferably arranged as multiple memory pages. While memory pages 131 are shown separate from the other items in main memory 120, each of the other items shown in main memory 120 in FIG. 1 preferably reside within one or more memory pages 131. In addition, the memory pages 131 could be a fixed size for all pages, or could be various different sizes.

Computer system 100 utilizes well known virtual addressing mechanisms that allow the programs of computer system 100 to behave as if they only have access to a large, single storage entity instead of access to multiple, smaller storage entities. Therefore, while data 121, operating system 122, shared instructions 123, processes 124A, ..., 124N, debugger 125, scratchpad 129 and pages 131 are shown to reside in main memory 120, those skilled in the art will recognize that these items are not necessarily all completely contained in main memory 120 at the same time, and are not necessarily in contiguous storage. It should also be noted that the term "memory" is used herein generically to refer to the entire virtual memory of computer system 100, and may include the virtual memory of other computer systems coupled to computer system 100.

Figure 2:
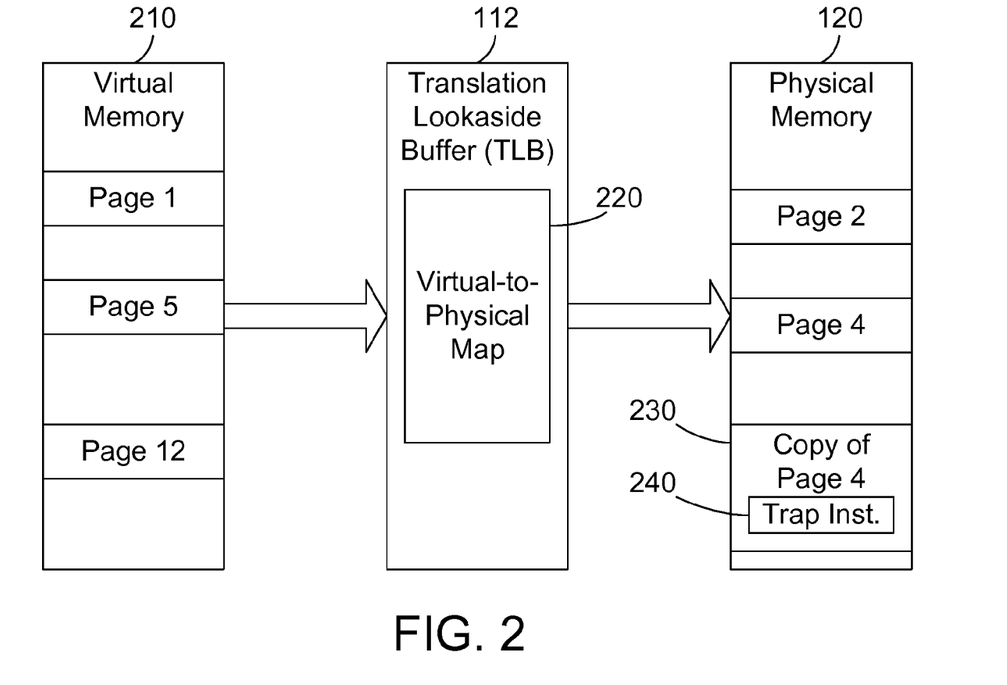
FIG. 2 is a block diagram that illustrates a translation lookaside buffer (TLB) that provides mapping between virtual and physical memory addresses.

The translation lookaside buffer (TLB) 112 is used to map virtual addresses available to the shared instructions 123 to corresponding physical addresses, as shown in FIG. 2. The virtual memory 210 represents an address space that is accessible by the shared instructions 123 in FIG. 1. The TLB 112 includes a virtual-to-physical map 220 that allows mapping any page in virtual memory to a corresponding page in physical memory. Thus, for the example shown in FIG. 2, Page 1 in the virtual memory 210 could be mapped by TLB 112 to Page 2 in the physical memory 120. Page 5 in the virtual memory 210 could be mapped by TLB 112 to page 4 in the physical memory 120. Also note that Page 12 in the virtual memory 210 could also be mapped by TLB 112 to Page 4 of the physical memory 120. Mapping two different virtual pages to the same physical page is one way for multiple processes accessing their own virtual memory block to access common physical memory.

Referring back to FIG. 1, processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that breakpoint processing may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Network interface 150 is used to connect computer system 100 to other computer systems or workstations via a network. Network interface 150 broadly represents any suitable way to interconnect electronic devices, regardless of whether the network comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Computer system 100 may include other features of computer systems that are not shown in FIG. 1 but are well-known in the art. For example, computer system 100 preferably includes a display interface and a mass storage interface to an external direct access storage device (DASD). The display interface is used to directly connect one or more displays to computer system 100. These displays, which may be non-intelligent (i.e., dumb) terminals or fully programmable workstations, are used to provide system administrators and users the ability to communicate with computer system 100. Note, however, that while a display interface is provided to support communication with one or more displays, computer system 100 does not necessarily require a display, because all needed interaction with users and other processes may occur via the network interface 150.

The mass storage interface is used to connect mass storage devices, such as a direct access storage device, to computer system 100. One specific type of direct access storage device is a readable and writable CD-RW drive, which may store data to and read data from a CD-RW.

While the description above is in the context of a fully functional computer system, those skilled in the art will appreciate that the debugger or breakpoint processing mechanism may be distributed as an article of manufacture in a variety of forms, and the claims extend to all suitable types of computer-readable media used to actually carry out the distribution, including recordable media such as floppy disks and CD-RW.

The breakpoint processing mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 3:
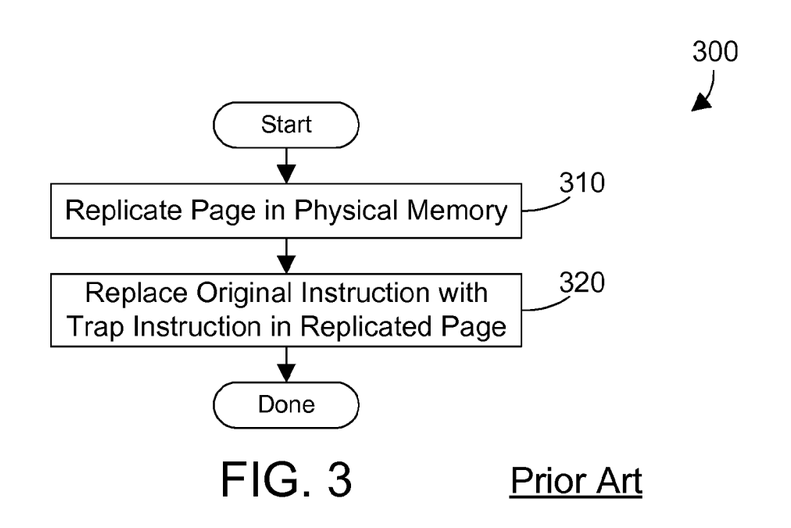
FIG. 3 is a flow diagram of a prior art method for installing a breakpoint.

A prior art method for installing a breakpoint in a computer system that executes shared instructions is shown in method 300 in FIG. 3. A page in physical memory is replicated (step 310). The original instruction in the replicated page is then replaced with the trap instruction (step 320). This is represented in FIG. 2 by the Copy of Page 4 230 that includes a trap instruction 240 in the physical memory 120. A process that set the breakpoint will have the TLB set to translate its virtual memory to the copy of page 4 230 while a process that did not set the breakpoint will have the TLB set to translate its virtual memory to the original page 4 that does not include the trap instruction. In this manner the prior art can avoid the trap instruction for processes that did not set a breakpoint by causing the process that did set the breakpoint to access a copy of the page that includes the trap instruction, while the process(es) that did not set the breakpoint will access the original page with the original instruction.

Figure 4:
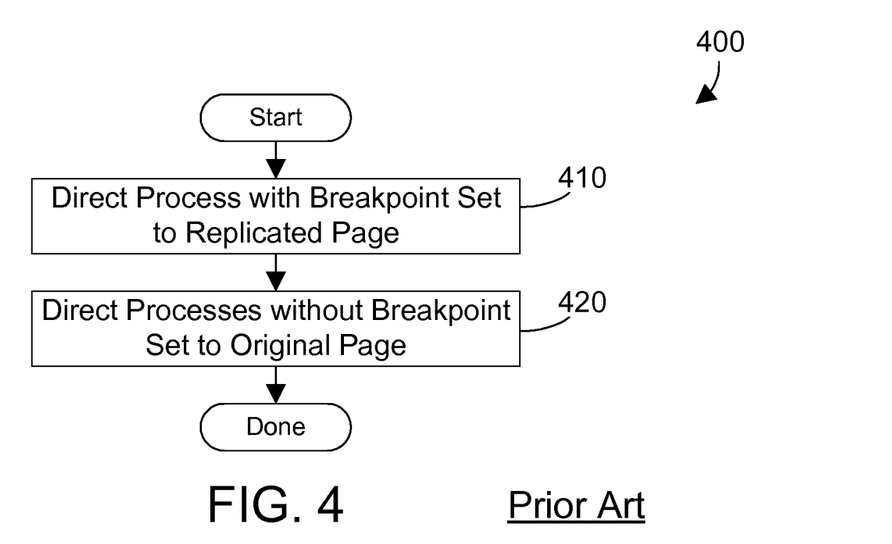
FIG. 4 is a flow diagram of a prior art method for processing a breakpoint.

The prior art method for processing a breakpoint that was set using method 300 in FIG. 3 is shown as method 400 in FIG. 4. A process with the breakpoint set is directed to the replicated page, which includes the trap instruction (step 410). Processes without the breakpoint set are directed to the original page (step 420). In this manner, the process that set the breakpoint can take the breakpoint while other processes can avoid the breakpoint. Note steps 410 and 420 are typically performed by writing to the TLB to change the virtual-to-physical map 220 for the process with the breakpoint set to point to the replicated page.

Figure 5:
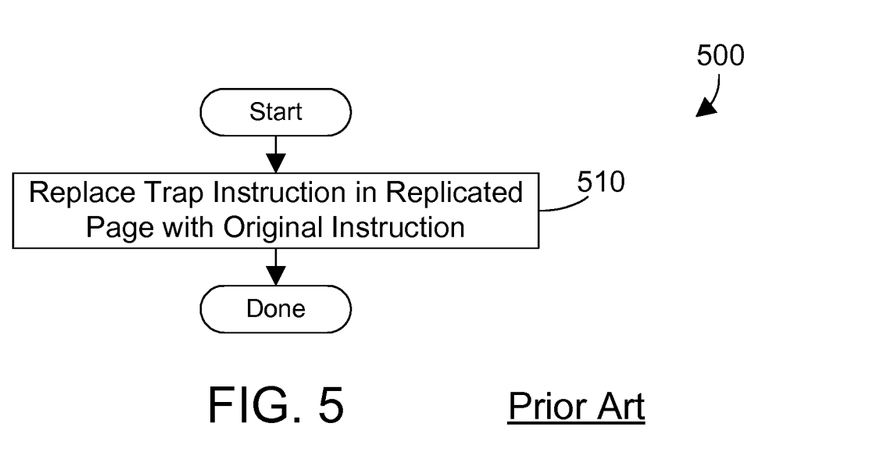
FIG. 5 is a flow diagram of a prior art method for removing a breakpoint.

A prior art method for removing the breakpoint is shown at method 500 in FIG. 5. To remove the breakpoint, the trap instruction in the replicated page is replaced with the original instruction (step 510). This means both the original page and the replicated page both contain the original instruction, thereby removing the trap instruction.

The process of replicating a memory page in FIGS. 2 and 3 is well-known in the art, and works well when the size of the memory page being replicated is relatively small. However, some modern computer systems have variable-sized pages, some of which are quite large. For example, nodes in a Blue-Gene computer system include memory pages that are 4 KB, 1 MB, 16 MB, 256 MB and 1 GB. When the memory pages become large, copying a page as shown in FIGS. 2 and 3 is not a practical solution. The disclosure and claims herein provide a solution that allows processes that did not set a breakpoint to skip a trap instruction in the shared instructions using a relatively small scratchpad. The scratchpad is dynamically created each time a process needs to bypass a trap instruction, then is not referenced after the process gets past the breakpoint in the shared instructions. As a result, an entire memory page need not be replicated and maintained, as shown in FIGS. 2 and 3.

Figure 6:
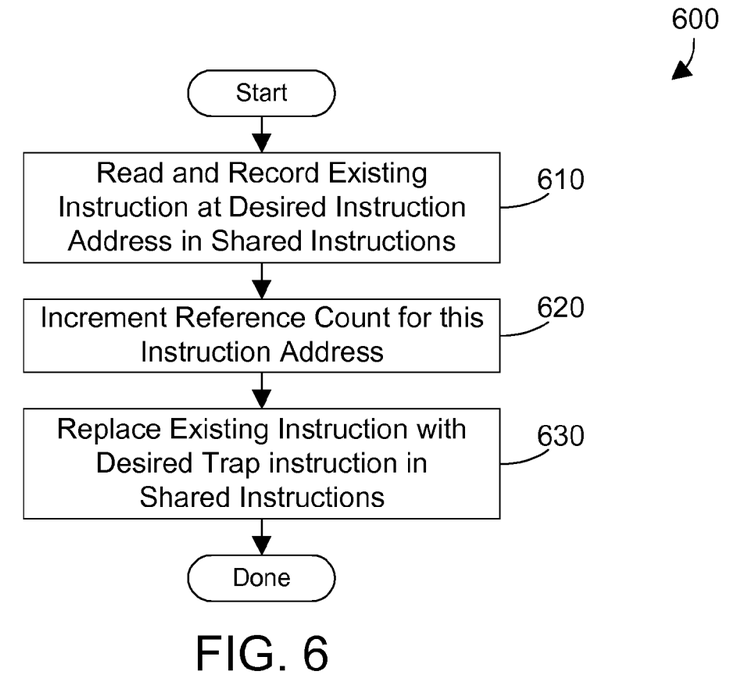
FIG. 6 is a flow diagram of a method for installing a breakpoint.

Referring to FIG. 6, a method 600 for installing a breakpoint begins by reading and recording the existing instruction at a desired instruction address (i.e., location) in the shared instructions (step 610). A reference count corresponding to the instruction address is then incremented (step 620). The existing instruction in the shared instructions is then replaced with the trap instruction (step 630). At this point a breakpoint has been installed at the desired location by writing the trap instruction to the shard instruction area. The potential problem with this approach is other processes that don't have the breakpoint set will now encounter the breakpoint because the trap instruction corresponding to the breakpoint is in the shared instructions that are executed by multiple processes. The discussion below shows how a process that does not have a breakpoint set at the desired location can avoid executing the trap instruction, and will execute instead the original instruction, even though the trap instruction resides in the shared instructions.

Figure 7:
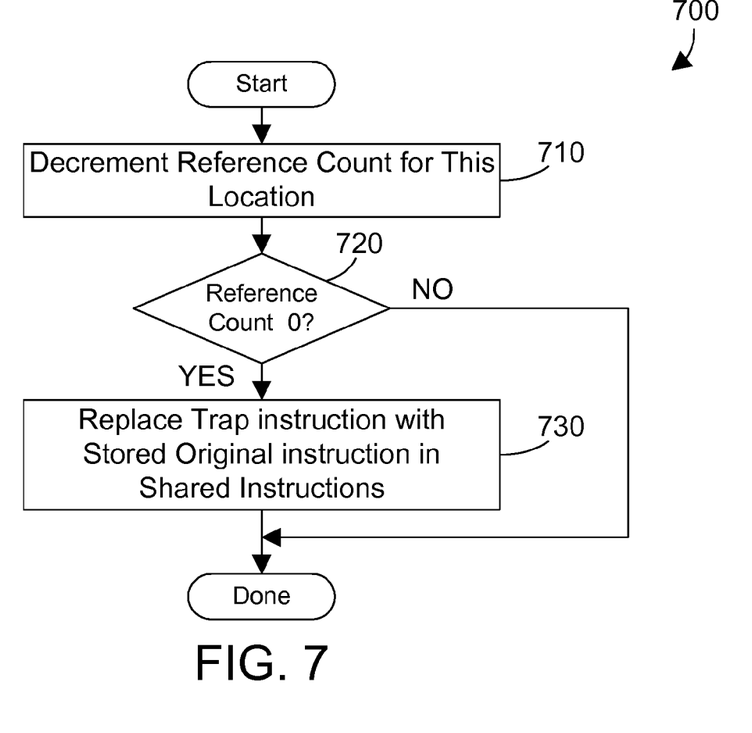
FIG. 7 is a flow diagram of a method that is run when a breakpoint is removed.

A method 700 for removing a breakpoint for a particular process is shown in FIG. 7. The reference count for this location is decremented (step 710). If the reference count is not zero (step 720=NO), this means one or more other processes still have a breakpoint set at this location, so method 700 is done. If the reference count is zero (step 720=YES), this means no other processes have a breakpoint set at this location, so the trap instruction in the shared instructions is replaced with the original instruction (step 730). Method 700 uses a reference counter to remove a trap instruction when no processes have a breakpoint set at that location, but leaves the trap instruction when one or more other processes have a breakpoint set at that location.

Figure 8:
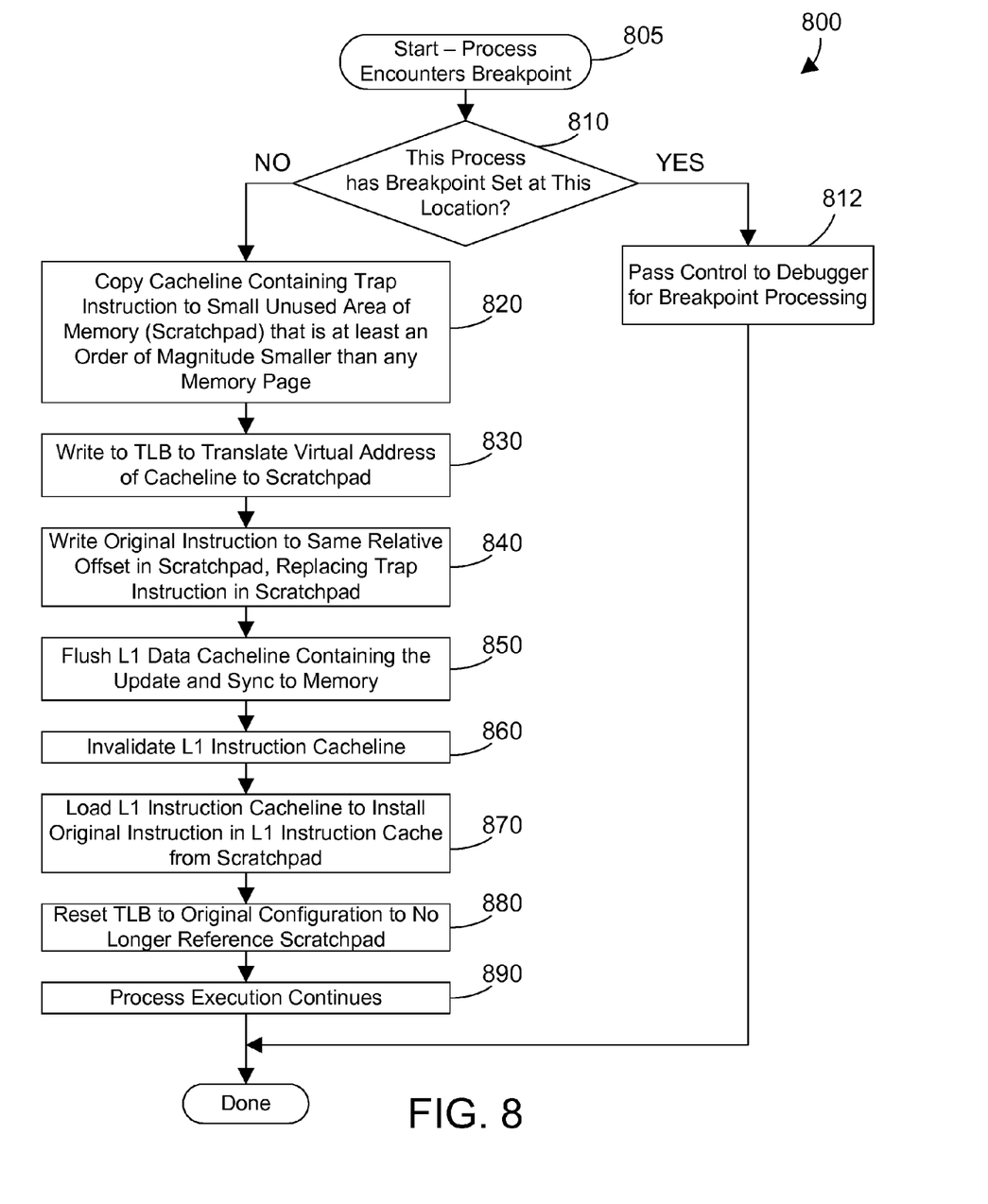
FIG. 8 is a flow diagram of a method for processing a breakpoint.

Referring to FIG. 8, a method 800 processes a breakpoint encountered by a process (step 805). As used in this disclosure and claims, a breakpoint is "encountered" if a processor detects the presence of a trap instruction before the trap instruction is executed, thereby giving the processor sufficient time to bypass the trap instruction, if needed. If the process that encountered the breakpoint has a breakpoint set at this location (step 810=YES), control is passed to the debugger for breakpoint processing (step 812). The breakpoint processing in step 812 is preferably known methods for a debugger to process a breakpoint, such as halting program execution, displaying register contents, allowing single-stepping program instructions, etc. If the process that encountered the breakpoint does not have a breakpoint set at this location (step 810=NO), the cacheline containing the trap instruction corresponding to the breakpoint is copied to a small unused area of memory, which we dub herein a "scratchpad" (step 820). While the scratchpad may be any suitable size, the scratchpad is preferably much smaller than a memory page, preferably at least an order of magnitude smaller than the smallest memory page. Next, a write to the TLB changes the translation of virtual addresses for the cacheline from the original memory page to the scratchpad (step 830). The original instruction is written to the same relative offset in the scratchpad, thereby replacing the trap instruction in the scratchpad (step 840). Next, the level 1 data cacheline containing the original trap instruction is flushed and synced to memory (step 850). The level 1 instruction cacheline is then invalidated (step 860). The L1 instruction cacheline is then loaded to install the original instruction in the L1 instruction cache (step 870). The TLB is then reset to the original configuration to no longer reference the scratchpad (step 880). The execution of the process then continues (step 890). Method 800 shows how processes that do not have a breakpoint set at a particular location may bypass the trap instruction in the shared instructions by loading the instruction cache from a scratchpad that has the trap instruction replaced by the original instruction. Note the trap instruction is still installed in the shared instructions, but method 800 allows processes to side-step the trap instruction that correspond to a breakpoint that is not set in those processes.

Figure 9:
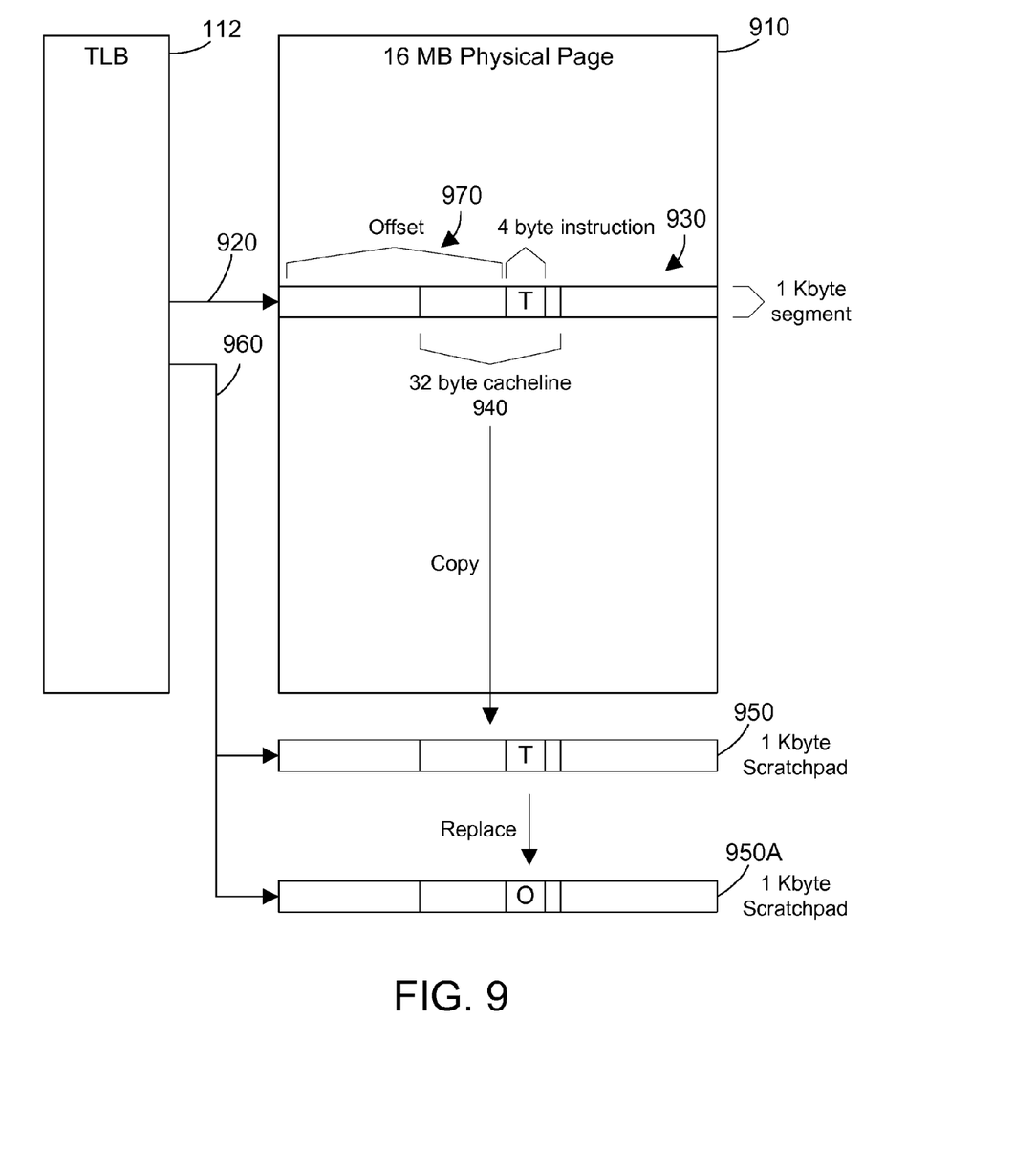
FIG. 9 is a block diagram illustrating one specific implementation that shows use of scratchpad memory described in the method of FIG. 8.

FIG. 9 shows a block diagram of one specific implementation that allows illustrating some of the steps shown in method 800 in FIG. 8. Originally the TLB 112 maps a 16 MB virtual memory page to a corresponding 16 MB physical memory page, shown in FIG. 9 at 910. We assume for this example the TLB divides up the 16 MB memory page into 1 Kbyte segments, and provides a mapping for each 1 Kbyte segment in virtual address space to a corresponding 1 Kbyte segment in physical address space. Thus, TLB includes a reference 920 that maps a 1 Kbyte segment in the 16 MB virtual memory page to a corresponding 1 Kbyte segment in the 16 MB physical memory page, shown at 930 in FIG. 9. The 1 Kbyte segment includes a 4-byte trap instruction, indicated in the segment with a T. We assume the trap instruction T is in a 32-byte cacheline shown at 940. We assume the scratchpad 129 in FIG. 1 is a 1 Kbyte segment of main memory 120 that is unused. The 32 byte cacheline 940 is copied to a 1 Kbyte scratchpad, shown as 950 in FIG. 9, as shown in step 820 in FIG. 8. Note the copied 1 Kbyte segment includes the trap instruction T that is in the physical memory page 910 that includes the shared instructions. Next, data is written to the TLB to change the virtual-to-physical mapping for the 1 Kbyte segment in the physical memory page to reference instead the 1 Kbyte scratchpad, as shown at step 830 in FIG. 8. This is shown in FIG. 9 with arrow 960 that references the scratchpad 950. Note that when reference 960 is in place, the reference 920 is removed, because the reference 960 replaces the reference 920 in the TLB. The original instruction is then written to the same relative offset in the scratchpad, as shown at 950A in FIG. 9, where instruction O (for "original") replaces the trap instruction T. The offset is shown at 970 in FIG. 9. This corresponds to step 840 in FIG. 9. Once the instruction cache for the process is loaded from the data in the scratchpad 950A in step 870 in FIG. 8, the TLB is reset to remove the reference 960 to the scratchpad 950A and to reinstate the original reference 920 to the 1 Kbyte segment 930 in the 16 MB physical memory page. The result is each process that does not have a breakpoint set at the location of a trap instruction can bypass the trap instruction by dynamically copying a small portion of the memory page to the scratchpad, replacing the trap instruction with the original instruction, loading the instruction cache from the scratchpad, then eliminating the reference to the scratchpad. Note there may be multiple scratchpads in use at the same time for different breakpoints and different processes at different locations in the shared instructions.

The disclosure and claims include a breakpoint processing mechanism and method for processing a breakpoint in an instruction stream that is shared by multiple processes. When a process that set a breakpoint at a particular location encounters the breakpoint, control is passed to the debugger for known debugging techniques. When a process that did not set the breakpoint at that location encounters the breakpoint, a small scratchpad memory is used to allow the process to bypass the breakpoint and execute instead the original instruction instead of the trap instruction that corresponds to the breakpoint. The scratchpad may be any suitable size, but is preferably at least an order of magnitude smaller than the smallest memory page. As a result, a full page copy is not required, as is commonly done in the prior art.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer system comprising:
at least one processor;
a memory coupled to the at least one processor, the memory being divided into a plurality of memory pages;
shared instructions residing in the memory;
a plurality of processes residing in the memory and executed by the at least one processor, the plurality of processes executing the shared instructions;
a debugger residing in the memory and executed by the at least one processor, the debugger comprising:
a breakpoint processing mechanism that installs a breakpoint by recording an original instruction at a desired location in the shared instructions and writing a trap instruction to the desired location in the shared instructions, the breakpoint processing mechanism passing control to the debugger when a process that installed the breakpoint encounters the trap instruction, the breakpoint processing mechanism skipping the trap instruction and executing the original instruction using a scratchpad memory that is at least an order of magnitude smaller than a smallest size of the plurality of memory pages when a process that did not set the breakpoint at the desired location encounters the trap instruction in the shared instructions; and
a reference count for the desired location that is incremented by the breakpoint processing mechanism when the breakpoint is installed, that is decremented by the breakpoint processing mechanism when the breakpoint for a given process is removed, wherein the breakpoint processing mechanism replaces the trap instruction with the original instruction in the shared instructions only when the reference count for the desired location is zero, indicating no processes have a breakpoint installed at the desired location.

2. The computer system of claim 1 wherein the breakpoint processing mechanism removes the breakpoint by replacing the trap instruction in the shared instructions with the original instruction.

3. The computer system of claim 1 wherein the processing mechanism processes a breakpoint at the desired location encountered by a given process by performing the steps of:
when the given process has a breakpoint set at the desired location, passing control to the debugger for breakpoint processing;
when the given process does not have a breakpoint set at the given location, performing the steps of:
copying a cacheline that contains the trap instruction to the scratchpad memory;
translating a virtual address of the cacheline from an original page in the memory to reference instead the scratchpad memory;
writing the original instruction to a same relative offset in the cacheline in the scratchpad memory, thereby replacing the trap instruction in the scratchpad memory with the original instruction;
flushing a level one data cacheline containing the trap instruction to the memory;
invaliding the cacheline that contains the trap instruction in a level one instruction cache;
loading the cacheline in the level one instruction cache from the scratchpad memory, thereby installing the original instruction in the level one instruction cache; and
translating the virtual address of the cacheline to reference the original page in the memory instead of the scratchpad memory.

4. A computer-implemented method for processing a breakpoint in a computer system that includes a plurality of processes that execute shared instructions, the method comprising the steps of:
(A) installing a breakpoint by performing the steps of:
recording an original instruction at a desired location in the shared instructions;
writing a trap instruction to the desired location in the shared instructions; and
incrementing a reference count for the desired location when any process installs the breakpoint at the desired location;
(B) processing the breakpoint by performing the steps of:
passing control to the debugger when a process that installed the breakpoint encounters the trap instruction; and
skipping the trap instruction and executing the original instruction using a scratchpad memory that is at least an order of magnitude smaller than a size of the plurality of pages in memory when a process that did not install the breakpoint encounters the trap instruction in the shared instruction;
(C) removing the breakpoint by performing the steps of:
decrementing the reference count when any process removes the breakpoint at the desired location; and
replacing the trap instruction in the shared instructions with the original instruction only when the reference count for the desired location is zero, indicating no processes have a breakpoint installed at the desired location.

5. The method of claim 4 further comprising the step of removing the breakpoint by replacing the trap instruction in the shared instructions with the original instruction.

6. The method of claim 4 further comprising the steps of:
when the given process has a breakpoint set at the given location, passing control to the debugger for trap processing;
when the given process does not have a breakpoint set at the given location, performing the steps of:
copying a cacheline that contains the trap instruction to the scratchpad memory;
translating a virtual address of the cacheline from an original page in the memory to reference instead the scratchpad memory;
writing the original instruction to a same relative offset in the cacheline in the scratchpad memory, thereby replacing the trap instruction in the scratchpad memory with the original instruction;
flushing a level one data cacheline containing the trap instruction to the memory;
invaliding the cacheline that contains the trap instruction in a level one instruction cache;
loading the cacheline in the level one instruction cache from the scratchpad memory, thereby installing the original instruction in the level one instruction cache; and
translating the virtual address of the cacheline to reference the original page in the memory instead of the scratchpad memory.

7. A computer-implemented method for processing a breakpoint in a computer system that includes a plurality of processes that execute shared instructions, the method comprising the steps of:
(A) installing a breakpoint by performing the steps of:
recording an original instruction at a desired location in the shared instructions;
incrementing a reference count for the desired location; and
writing a trap instruction to the desired location in the shared instructions;
(B) processing the breakpoint by performing the steps of:
when the given process has a breakpoint set at the given location, passing control to the debugger for trap processing;
when the given process does not have a breakpoint set at the given location, performing the steps of:
copying a cacheline that contains the trap instruction to a scratchpad memory;
translating a virtual address of the cacheline from an original page in the memory to reference instead the scratchpad memory;
writing the original instruction to a same relative offset in the cacheline in the scratchpad memory, thereby replacing the trap instruction in the scratchpad memory with the original instruction;
flushing a level one data cacheline containing the trap instruction to the memory;
invaliding the cacheline that contains the trap instruction in a level one instruction cache;
loading the cacheline in the level one instruction cache from the scratchpad memory, thereby installing the original instruction in the level one instruction cache; and
translating the virtual address of the cacheline to reference the original page in the memory instead of the scratchpad memory;
(C) removing the breakpoint by performing the steps of:
decrementing the reference count at the desired location; and
replacing the trap instruction in the shared instructions with the original instruction only when the reference count for the desired location is zero, indicating no processes have a breakpoint installed at the desired location.

8. An article of manufacture comprising:
(A) a debugger comprising a breakpoint processing mechanism that installs a breakpoint by recording an original instruction at a desired location in shared instructions executed by a plurality of processes and writes a trap instruction to the desired location in the shared instructions, the breakpoint processing mechanism passing control to the debugger when a process that installed the breakpoint encounters the trap instruction, the breakpoint processing mechanism skipping the trap instruction and executing the original instruction using a scratchpad memory that is at least an order of magnitude smaller than a smallest size of the plurality of memory pages when a process that did not set the breakpoint at the desired location encounters the trap instruction in the shared instructions, the debugger further comprising a reference count for the desired location that is incremented by the breakpoint processing mechanism when the breakpoint is installed, that is decremented by the breakpoint processing mechanism when the breakpoint for a given process is removed, wherein the breakpoint processing mechanism replaces the trap instruction with the original instruction in the shared instructions only when the reference count for the desired location is zero, indicating no processes have a breakpoint installed at the desired location; and (C) non-transitory recordable media bearing the debugger.

9. The article of manufacture of claim 8 wherein the breakpoint processing mechanism removes the breakpoint by replacing the trap instruction in the shared instructions with the original instruction.

10. The article of manufacture of claim 8 wherein the processing mechanism processes a breakpoint at the desired location encountered by a given process by performing the steps of:

when the given process has a breakpoint set at the desired location, passing control to the debugger for breakpoint processing;

when the given process does not have a breakpoint set at the given location, performing the steps of:

copying a cacheline that contains the trap instruction to the scratchpad memory;

translating a virtual address of the cacheline from an original page in the memory to reference instead the scratchpad memory;

writing the original instruction to a same relative offset in the cacheline in the scratchpad memory, thereby replacing the trap instruction in the scratchpad memory with the original instruction;

flushing a level one data cacheline containing the trap instruction to the memory;

invaliding the cacheline that contains the trap instruction in a level one instruction cache;

loading the cacheline in the level one instruction cache from the scratchpad memory, thereby installing the original instruction in the level one instruction cache; and translating the virtual address of the cacheline to reference the original page in the memory instead of the scratchpad memory.

* * * * *